United States Patent [19]

Nomi

[11] Patent Number: 5,037,554
[45] Date of Patent: Aug. 6, 1991

[54] SELECTIVELY PERMEABLE MEMBRANE

[76] Inventor: Haruo Nomi, 15-9, 1-Chome, Sakuragaokanishi, Sanyo-Cho, Akaiwa-Gun, Okayama-Ken, Japan

[21] Appl. No.: 525,419

[22] Filed: May 18, 1990

[51] Int. Cl.$^5$ .............................................. B01D 13/00
[52] U.S. Cl. ................................... 210/640; 210/651; 210/653; 210/500.27; 210/500.43; 55/16; 264/289.3
[58] Field of Search .............. 210/654, 500.23, 500.38, 210/615, 500.25, 653, 650, 651, 653, 500.1, 500.27, 500.43, 500.36, 500.29, 640; 264/289.3; 428/336, 216, 315, 290; 159/49; 55/16

[56] References Cited

U.S. PATENT DOCUMENTS

| | | | |
|---|---|---|---|
| 3,750,735 | 8/1973 | Chiang et al. | 159/49 |
| 3,756,735 | 8/1973 | Chiang et al. | 210/640 |
| 4,066,731 | 1/1978 | Hungerford | 264/289.3 |
| 4,113,912 | 9/1978 | Okita | 428/290 |
| 4,194,041 | 3/1980 | Gore et al. | 428/315 |
| 4,265,959 | 5/1981 | Sano et al. | 428/216 |
| 4,584,103 | 4/1986 | Linder et al. | 210/640 |
| 4,604,323 | 8/1986 | Johnson | 428/336 |
| 4,659,474 | 4/1987 | Perry et al. | 210/638 |
| 4,690,765 | 9/1987 | Linder et al. | 210/500.29 |
| 4,778,596 | 10/1988 | Linder et al. | 210/500.38 |
| 4,871,461 | 10/1989 | Karakane et al. | 210/654 |
| 4,889,636 | 12/1989 | Perry et al. | 210/651 |

FOREIGN PATENT DOCUMENTS

| | | |
|---|---|---|
| 0326360 | 8/1989 | European Pat. Off. |
| 0323431 | 11/1989 | European Pat. Off. |
| 2740252 | 4/1978 | Fed. Rep. of Germany |
| 1495887 | 12/1977 | United Kingdom |

OTHER PUBLICATIONS

Abstract-CA 99: 214823p-Membrane for Prevaporation-Sumitoma-Jpn. Kokai Tokkyo Koho UP 58-15630 4-9/83.

Primary Examiner—Robert A. Dawson
Assistant Examiner—Ana M. Fortuna
Attorney, Agent, or Firm—Gary A. Samuels

[57] ABSTRACT

A water vapor permeable membrane, selectively impermeable to acid vapors, being constructed from a thin film layer of sulfoanted polyacrylonitrile containing a cationic dye on a supporting porous polyterafluoroethylene membrane.

3 Claims, 3 Drawing Sheets

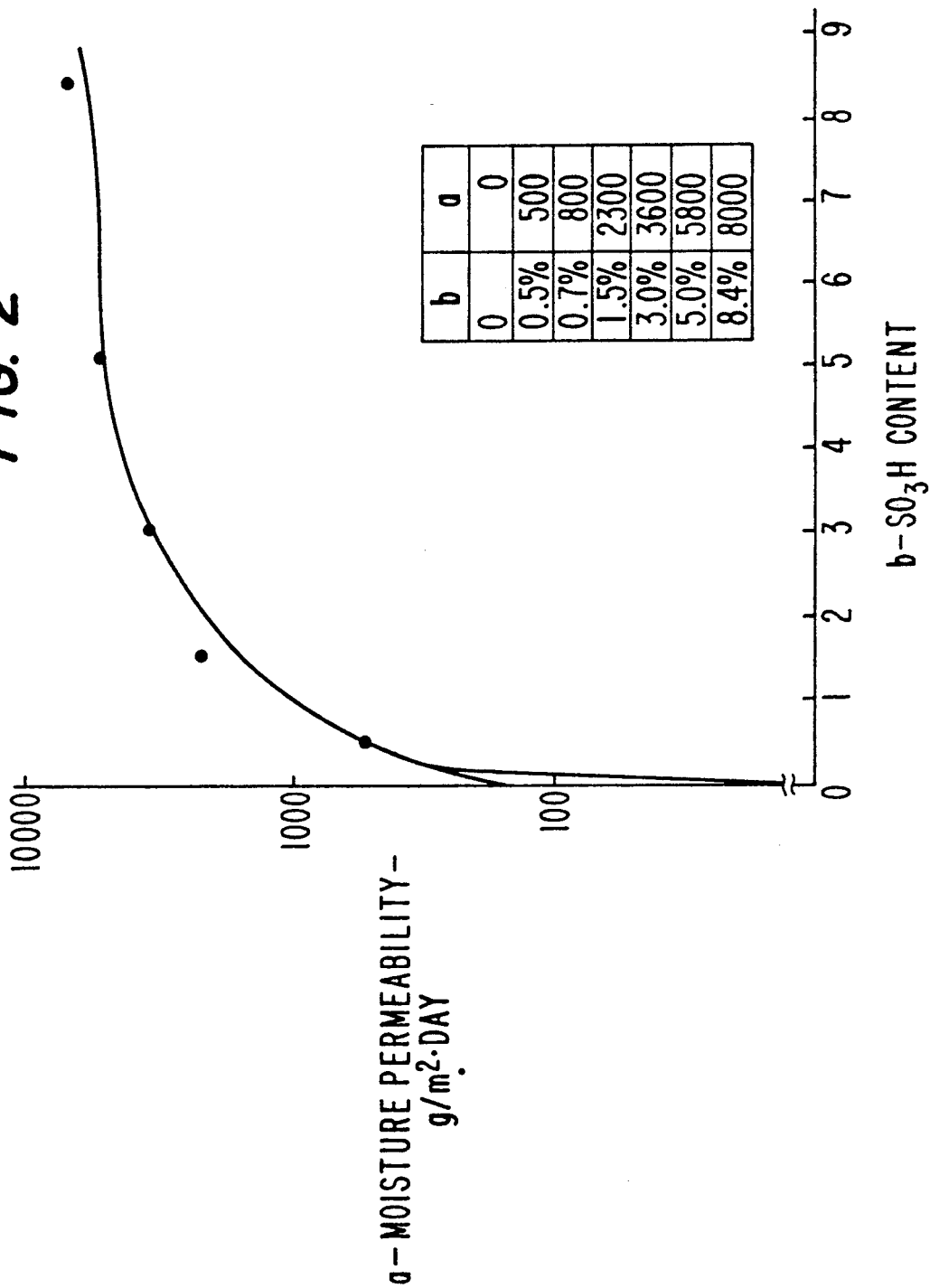

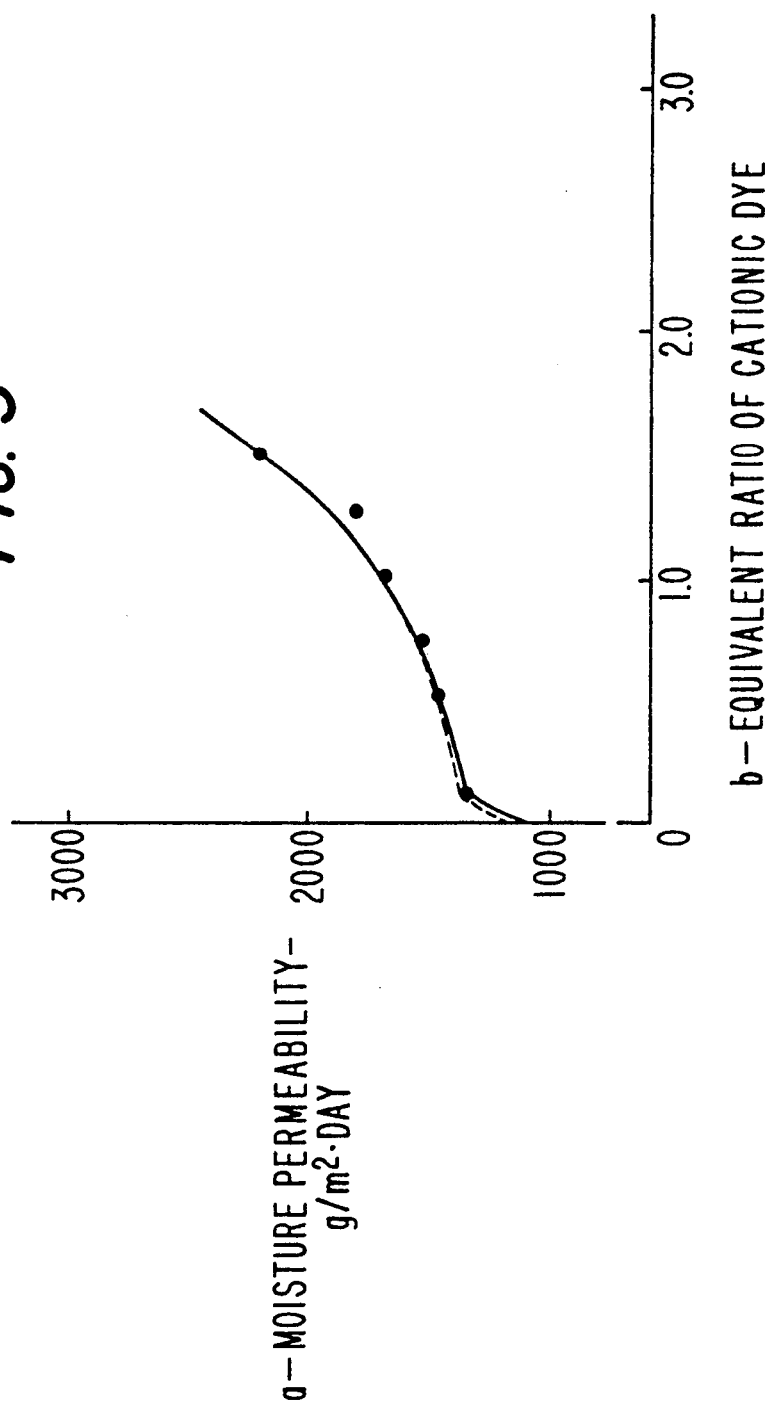

SELECTIVELY PERMEABLE MEMBRANE

FIELD OF THE INVENTION

The invention relates to membranes having a selective permeability to water vapor which property can be used to separate water vapor from vapor of aqueous acids and in dehumidification and separation of industrially useful gases and in protection of instruments and sensors.

BACKGROUND OF THE INVENTION

The use of macromolecular membranes as membrane materials for the separation and concentration of specified gases from gas mixtures has been widely studied and such membranes have been used in practical applications. Specifically, in the case of separation methods using such membrane materials, it is necessary that the membrane material used be superior in terms of gas permeability and selectivity for the gas that is to be separated and show stable characteristics in operation over a long period of time.

However, in the case of the conventional techniques above, it is not easy to separate water vapor from acid vapors such as vapors of acetic acid, formic acid, nitric acid or sulfuric acid which have a strong affinity for water vapor. Membrane materials which effectively block the passage of such acid vapors while allowing the passage of water vapor have not yet been obtained.

SUMMARY OF THE INVENTION

The present invention provides a selectively permeable membrane which is selectively permeable to water vapor, shows a superior selectivity to acid vapors, a superior water vapor permeability, and stable performance values. The selectively permeable membrane of the invention comprises a thin film of polyacrylonitrile resin containing about 0.5 to about 10% sulfonic acid group supported on a porous polytetrafluoroethylene (PTFE) or polyolefin film. The polyacrylonitrile resin also preferably contains a cationic dye in an amount equivalent to 0.1 or greater relative to the amount of sulfonic acid groups present in the polyacrylonitrile resin. The selectively permeable membrane is prepared by coating a solution of the sulfonated polyacrylonitrile resin containing the requisite amount of cationic dye on the porous PTFE film and drying the film deposited thereon in an oven to give the acid vapor resistant coated film of the invention.

BRIEF DESCRIPTION OF THE DRAWINGS

FIG. 2 shows a graph of data showing separation characteristics of permeable membranes containing no cationic dye.

FIG. 3 describes a graph of data showing separation characteristics of permeable membranes containing a cationic dye.

DETAILED DESCRIPTION OF THE INVENTION

Figure 1:
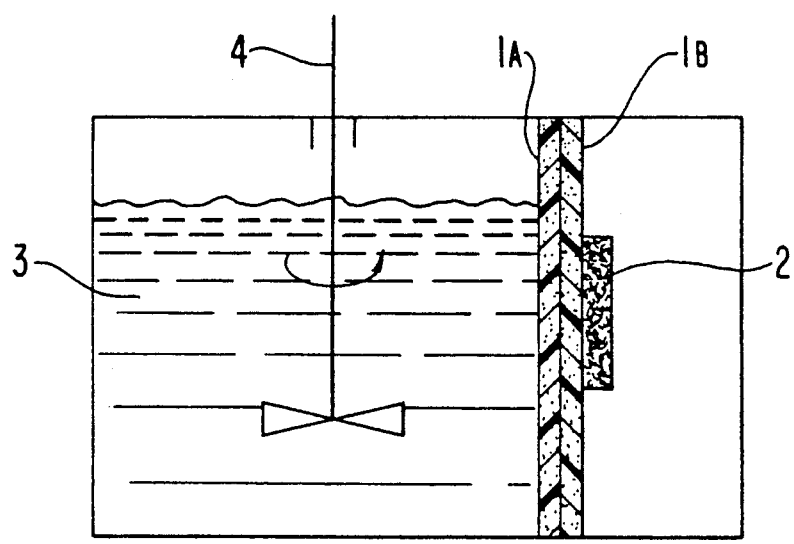
FIG. 1 is a diagram of the test set-up for measuring acid vapor blocking performance of permeable membranes.
Figure 4:
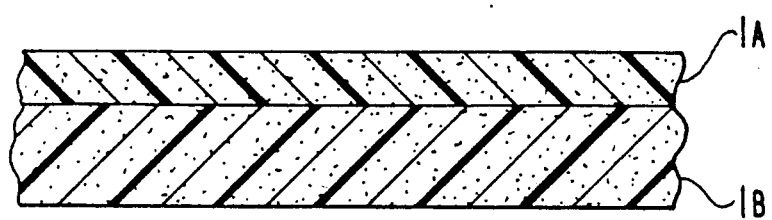
FIG. 4 shows a selectively permeable membrane of the invention.

The selectively permeable membrane of the invention is described in detail in the following figures, examples, and description.

Selective permeability to water vapor can be reliably obtained in a polyacrylonitrile resin which contains 0.5 to 10% sulfonic acid groups. If the sulfonic acid group content is less than 0.5%, it is difficult to obtain sufficient moisture permeability. On the other hand, if the sulfonic acid group content exceeds 10%, the solubility of the resin in solvents becomes poor, making the resin difficult to coat on the support film, and the water-soluble component of the membrane increases so that it becomes extremely difficult to obtain stable performance.

Since a porous PTFE resin or polyolefin resin is used for the macromolecular support film, acid vapors do not cause any degeneration of the support film. Accordingly, desirable durability is obtained.

An acid vapor blocking function is insured by adding a cationic dye to the polyacrylonitrile resin at an equivalent ratio of 0.1 or greater relative to the amount of sulfonic acid group. Hater resistance and durability are obtained by setting this equivalent ratio at 2 or less.

Specifically, FIG. 2 shows the separation characteristics measured when a pure polyacrylonitrile resin containing no cationic dye was applied to the surface of a drawn porous PTFE film (porosity 80%, mean pore diameter 0.2 micron, thickness 100 microns) so that a coating with a thickness of approximately 2 microns was formed. In contrast, FIG. 3 shows the separation characteristics measured when a cationic dye was added to the same resin. It is seen that the separation characteristics and acid vapor blocking function were greatly improved in the case of FIG. 3. The polyacrylonitrile containing sulfonic acid groups preferred for use in the membrane of the invention is a copolymer of acrylonitrile and sodium styrenesulfonate. The styrene sulfonate can be substituted by either a vinylsulfonate or a 2-acrylamidopropanesulfonate. A small amount of methyl acrylate, 2-methyl-5-vinylpyridine, or vinyl chloride may also be included in the resin. The useful range of sulfonate group in the copolymer is about 0.5 to about 10% by weight.

Cationic dyes containing a triphenylmethane, azo, methenyl, or oxazine group are suitable for the purpose of the invention. Shown below are suitable examples of azo A and methenyl M dyes which can be used.

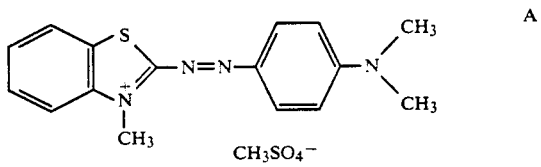

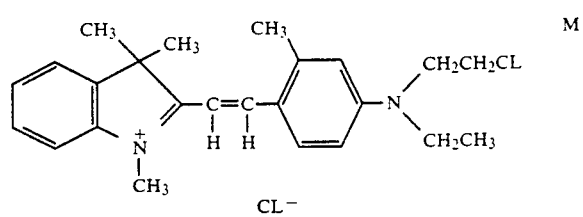

Vinyl compounds having a sulfonic acid group can be used, for example sodium p-styrensulfonate, vinyl sulfonate, or 2-acrylamidopropanesulfonate, the preferred sulfonate being sodium p-styrenesulfonate.

EXAMPLE 1

A copolymer consisting chiefly of polyacrylonitrile and containing 5 weight % sulfonic acid groups was dissolved at a concentration of 2% in dimethylformamide. A cationic dye was added to this solution at an equivalent ratio of 1 : 1 relative to the sulfonic acid group content, and the resulting mixture heated and agitated so that the sulfonic acid groups reacted with the cationic dye. Solvents such as dimethyl sulfoxide may also be effectively used for the same purpose.

This solution was uniformly applied to the surface of a drawn porous PTFE film having a porosity of 80%, a mean pore diameter of 0.2 micron, and a thickness of 50 microns, and this coated film was dried in an oven at 165° C., thus producing a selectively permeable membrane with a coating film thickness of approximately 2 microns.

The preferred porous PTFE film is made according to one or more of U.S. Pat. Nos. 3,953,566, 4,187,390, 3,962,153, and 4,096,227, which are hereby incorporated by reference, the hydrophobic porous film serving as a supportive substrate for the sulfonated acrylonitrile resin.

The resulting solution was uniformly applied to the surface of a drawn porous PTFE film having a porosity of 70%, a mean pore diameter of 0.1 micron, and a thickness of 30 microns, and this coated film was dried in an oven at 165° C., thus producing a selectively permeable membrane having a coating film thickness of approximately 1 micron.

The moisture permeablility values of the above membranes obtained in Examples 1-3 as well as the moisture permeability values of a comparative sample film consisting of drawn porous PTFE (porosity 80%, mean pore diameter 0.2 micron, thickness 100 microns), and a comparative film sample prepared by applying a polyvinyl alcohol coating (thickness 2 microns) to a drawn porous PTFE film, were measured by the method described in JIS L 1099B.

The acid vapor blocking performance values of the above samples were measured as follows. In each case, sample film having sulfonate layer 1A and PTFE layer 1B with a sheet of pH paper 2 pasted to it was set inside a transparent glass vessel 10 placed inside an air oven at 60° C. as shown in FIG. 1. Next an acid solution 3 was introduced into glass vessel 10 on one side of the sample film and with the solution under agitation by means of agitator 4, the time required for pH paper 2 to show a color change (pH 4) was determined. This measurement process was performed for hydrochloric acid, acetic acid, sulfuric acid, and phosphoric acid. The results obtained are shown in Table 1.

TABLE 1

| Sample Film | Moisture Permeability (g/m 24 hours) | Hydrochloric Acid (sec) | | Acetic Acid (sec) | | Sulfuric Acid (days) | | Phosphoric Acid (days) | |
|---|---|---|---|---|---|---|---|---|---|
| | | 10% | 20% | 10% | 20% | 10% | 20% | 10% | 20% |
| Example 1 | 18,000 | 3,000 | 2,400 | 3,500 | 3,100 | >60 days | >60 days | >60 days | >60 days |
| Example 2 | 20,000 | 3,000 | 2,700 | 3,100 | 2,000 | >60 days | >60 days | >60 days | >60 days |
| Example 3 | 3,000 | 3,200 | 2,500 | 3,600 | 2,700 | >60 days | >60 days | >60 days | >60 days |
| Drawn porous PTFE | 60,000 | 2 | 2 | 2 | 2 | <1 day | <1 day | <1 day | <1 day |
| Drawn porous PTFE + polyvinyl alcohol film | 2,000 | 10 | 5 | 10 | 3 | <1 day | <1 day | <1 day | <1 day |

EXAMPLE 2

A copolymer consisting chiefly of polyacrylonitrile containing 8% by weight sulfonic acid groups was dissolved at a concentration of 3% in dimethylformamide. A cationic dye was added to this solution at an equivalent ratio of 1 : 2 relative to the amount of sulfonic acid group and the resulting mixture heated and agitated so that the sulfonic acid groups reacted with the cationic dye.

The reaction product solution thus obtained was uniformly applied to the surface of a drawn porous PTFE film having a porosity of 80%, a mean pore diameter of 0.2 micron, and a thickness of 150 microns, and this coated film was dried in an oven at 165° C., thus producing a selectively permeable membrane having a coating film thickness of approximately 2.5 microns.

EXAMPLE 3

A copolymer consisting chiefly of polyacrylonitrile and containing 1% by weight sulfonic acid groups was dissolved at a concentration of 0.5% in dimethylformamide. A cationic dye was added to this solution at an equivalent ratio of 1 : 0.1 relative to the amount of sulfonic acid group and a reaction was performed with heating and agitation.

Specifically, it was confirmed that the membranes obtained in the examples of application of the invention each had a high moisture permeability and showed a markedly high acid vapor blocking performance with respect to all of the acids tested. Thus, it was confirmed that each of the membranes had a superior selective permeability.

Thus, the invention provides a permeable membrane which has a superior selective permeability which prevents the passage of acid vapors that have a strong affinity for water vapor. Further, the membrane of the present invention has a superior gas permeability and durability, properties which are very useful industrially.

I claim:

1. A selectively permeable membrane comprising:
   (a) an outer layer consisting essentially of a thin film of sulfonated polyacrylonitrile containing about 0.5 to about 10% by weight sulfonic acid groups and a cationic dye on
   (b) an inner layer consisting essentially of a porous polytetrafluoroethylene or a porous polyolefin support membrane.

2. A membrane of claim 1 wherein the quantity of cationic dye contained in said sulfonated polyacrylonitrile layer is at an equivalent ratio of about 0.2 to about 2 relative to the amount of sulfonic acid groups.

3. A process for selectively excluding acid vapors from water vapor comprising the steps of passing said water vapor through a selectively permeable membrane consisting essentially of an outer layer of sulfonated polyacrylonitrile containing about 0.5 to about 10% by weight sulfonic acid groups and a cationic dye on an inner layer of porous polytetrafluoroethylene support membrane.

* * * * *